Dec. 22, 1970 J. A. BRIGHT 3,550,008
RADIO FREQUENCY CARRIER WAVE SIGNAL DETECTOR
Filed Sept. 6, 1967 2 Sheets-Sheet 1

INVENTOR.
James A. Bright
BY
ATTORNEYS

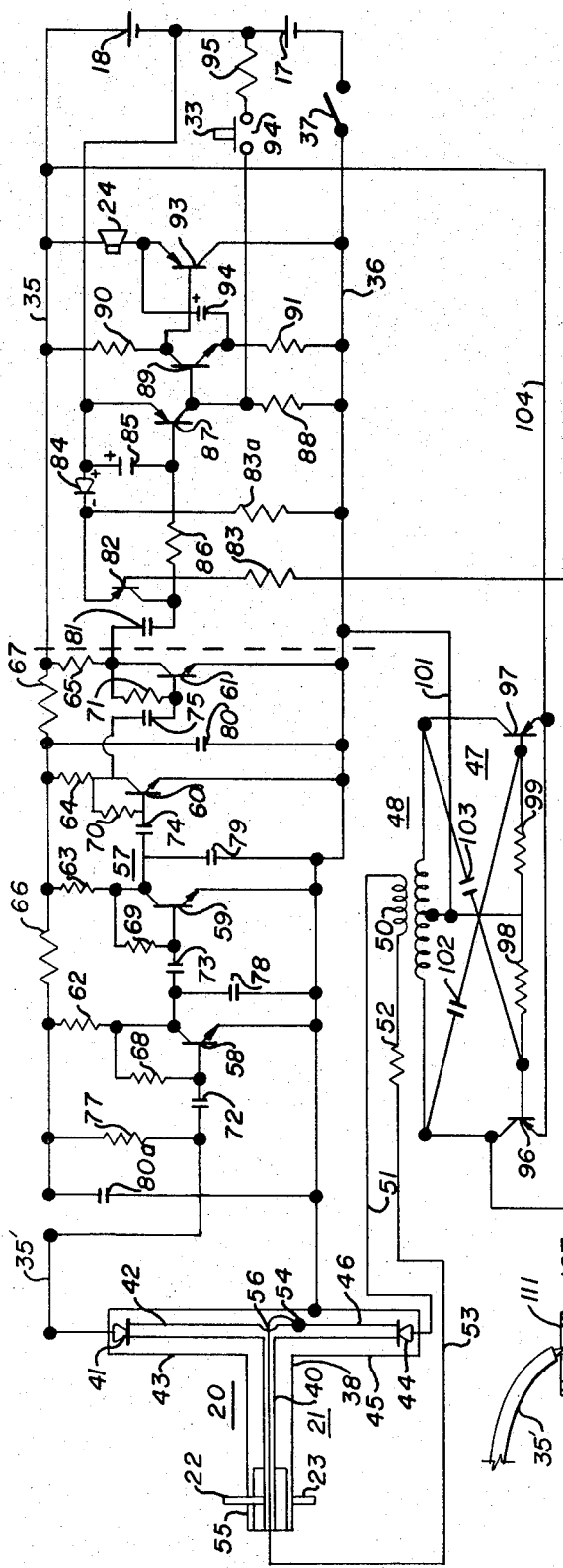

United States Patent Office 3,550,008
Patented Dec. 22, 1970

3,550,008
RADIO FREQUENCY CARRIER WAVE
SIGNAL DETECTOR
James A. Bright, Denver, Colo., assignor of one-half to
Kenneth De John, Lakewood, Colo.
Filed Sept. 6, 1967, Ser. No. 665,815
Int. Cl. H04b 1/22
U.S. Cl. 325—340                                    7 Claims

ABSTRACT OF THE DISCLOSURE

An apparatus for detecting unmodulated continuous waves at radio frequencies comprises a crystal detector and a modulating crystal diode for low frequency modulation of the received radio signal. The detector output is amplified and supplied through a synchronous detector and a filter to an alarm or indicator circuit. The apparatus makes it feasible to employ inexpensive components while securing very high sensitivity with minimum use of power.

This invention relates to high sensitivity continuous wave radio frequency detectors and particularly to an improved detector of simplified construction utilizing modulation of the input signal.

It is an object of this invention to provide an improved apparatus for detecting unmodulated continuous radio frequency waves.

It is another object of this invention to provide an improved apparatus for detecting continuous radio frequency waves and which has very high sensitivity and is inexpensive to manufacture.

Briefly, in carrying out the objects of this invention in one embodiment thereof, an apparatus for detecting or measuring continuous wave radio frequency signals in the microwave range is provided which comprises a dipole antenna and a coaxial transmission line connected to the antenna and to a detector crystal diode and a modulating crystal diode is mounted in a stub located on the line. A second stub which is a quarter wave long at a frequency to be received is also located on the line and is shorted. A low frequency modulating voltage is applied to the modulating diode and the modulating voltage is isolated from the transmission line by shorting the modulation current through the quarter wave stub and further isolation is provided by providing a separate path for the modulating current. The modulating voltage is applied by employing a floating secondary winding of the modulating transformer through a lead insulated from the transmission line. A signal processing circuit connected to the detector diode includes a narrow band amplifier, a synchronous detector, a low pass filter and an alarm or signal device operated upon receiving of the radio frequency signals. Very high sensitivity is achieved in a simple and inexpensive circuit.

The features of novelty which characterize this invention are pointed out with particularity in the claims annexed to and forming a part of this specification. The invention itself, however, both as to its organization and manner of operation together with other objects and advantages thereof may best be understood by reference to the following description taken in connection with the accompanying drawings in which:

FIG. 3 is a schematic diagram of the circuits of the unit of FIG. 1;

FIG. 4 is an enlarged plan view of the antenna and transmission line assembly of the detector of FIG. 1;

FIG. 5 is a somewhat enlarged side elevation view of the device of FIG. 4, and

FIG. 6 is a partial elevation view of the lower end of the device as shown in FIG. 4.

Figures 1, 2:
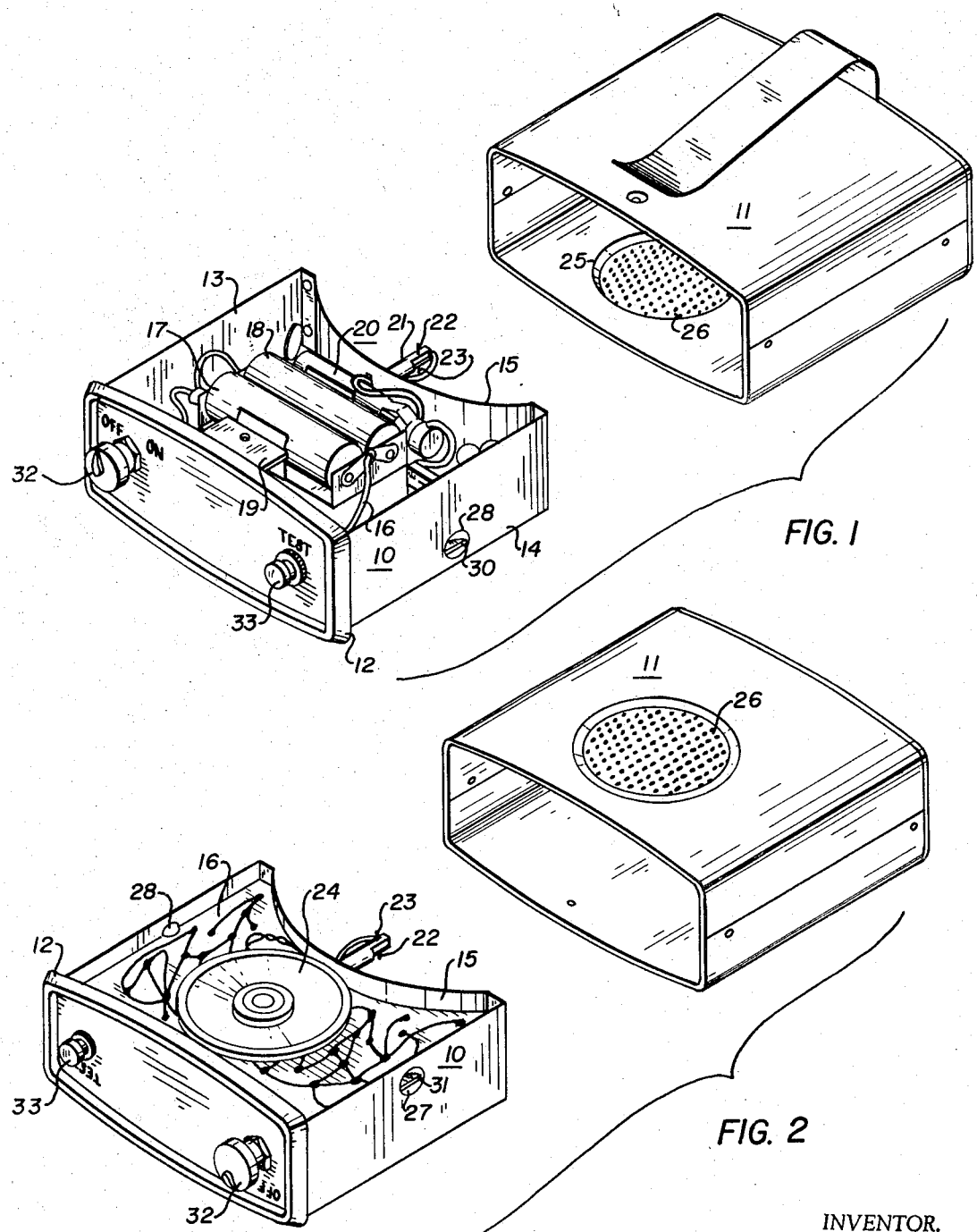
FIG. 1 is a perspective view of a radio frequency wave detector embodying the invention shown with the cover in a removed position.
FIG. 2 is a perspective view similar to FIG. 1 showing the detector and cover in position upside-down from that of FIG. 1.

Referring now to the drawings, the radio frequency wave detector illustrated in FIGS. 1 and 2 comprises a unit or chassis 10 arranged to fit within a cover 11. The unit 10 includes a front panel 12 of suitable rigid insulating material to which is secured a pair of side walls 13 and 14 connected by a rear wall 15 which is in the configuration of a parabola. Within the unit 10 there is mounted a printed circuit board 16 on the upper side of which as shown in FIG. 1 are mounted the components of the circuit. Dry cell batteries 17 and 18 are mounted on a bracket 19 attached to the front panel 12. A detector and modulator unit 20 is provided which includes a transmission line 21 extending through the parabolic wall 15 and having a dipole antenna including poles 22 and 23 thereon located generally along the focal line of the parabola. On the underside of the printed circuit board as shown in FIG. 2 the circuitry is visible and also a speaker 24 which is arranged to register with an opening 25 in the bottom of the cover 11 and which is covered by a suitable perforated plate 26 to afford passage of sound. The printed circuit board is held in place on the walls 13 and 14 by slotted indentations 27 and 28, the edge of the board being visible at 30 in slot 28 in FIG. 1, and at 31 in the slot 28 in FIG. 2.

The unit 10 is provided with a main switch actuated by a knob 32 and a test switch actuated by a button 33, both mounted on the panel 12.

As indicated in the schematic diagram FIG. 3, the batteries 17 and 18 are connected in series to supply a positive line 35 and a negative line 36, the switch actuated by the knob 32 being indicated at 37 in the negative line. The negative line 36 provides the reference potential and is preferably connected to the metal structure of the chassis. The incoming signal is supplied from the antenna unit 20, the outer conductor of the coaxial line carries the dipole element 23 and is connected to the line 36; the transmission line 21 has its outer conductor 38 connected to the line 36 and its inner conductor 40 connected to the dipole element 22 and to a detector diode 41 by a central conductor 42 within a stub 43. The antenna unit 20 is mounted on the assembly by soldering or otherwise bonding the outer conductor 38 to the parabolic reflector wall 15 as indicated by the portion of the wall shown in section in FIG. 4. The modulator diode 44 is connected within the modulator stub 45 and is connected to the center conductor of the transmission line through a center conductor 46 of the stub. Modulation current is generated by a square-wave oscillator 47 which includes the primary winding of transformer 48 having its secondary 50 connected on one side to the modulator diode 44 through lead 51 and on its other side through a resistance 52 and lead 53 which is connected to the conductor 46 at 54. The modulation current is isolated from the transmission line 20 because the lead 53 is insulated and passes into the transmission line 20 through a shorted stub indicated generally at 55 and thence through the center hollow conductor of the transmission line to the point 54 which is between the modulator diode 44 and the connection between the center conductor 46 and the transmission center conductor 40. The lead 53 passes out of the center conductor 40 through an opening 56 in the center conductor in alignment with the conductor 40.

The output of the detector diode 41 is supplied to an amplifier 57 comprising four stages each having a respective transistor indicated at 58, 59, 60 and 61. The four transistors include collector resistances 62, 63, 64 and 65, respectively, connected to the positive voltage line 35, a resistance 66 being connected with the line 35 between the junctions with the resistances 62 and 63 and a resistance 67 being connected in the line between the junctions with the resistances 64 and 65, respectively. The base of each transistor is connected to the collector thereof by resistances 68, 69, 70 and 71, respectively. The input signal is applied to the base 58 through a capacitor 72 and similar coupling capacitors 73, 74 and 75 are provided to couple the successive transistors 59, 60 and 61. The diode 41 is connected to the line 35 through a resistance 77, capacitors 78 and 79 are connected across the outputs of transistors 58 and 59 and a capacitor 80 is connected between the junction of resistances 66 and 67 and the line 36. A capacitor 80a is connected between the junction of resistors 66 and 77 and the line 36. The amplifier comprising the transistors 58, 59, 60 and 61 is a narrow band amplifier with a controlled phase shift and its output is coupled through capacitor 81 to the collector of a PNP transistor 82 which is driven by the oscillator 47 connected through resistance 83 to the base of the transistor. A temperature compensation diode 84 is connected in the emitter circuit of transistor 82 and such diode is biased by current through resistance 83a. A capacitor 85 and resistance 86 form a low pass filter to filter the signal applied between the base and the emitter of a PNP transistor 87 which is normally non-conducting and is rendered conducting upon suitable signal voltage across the capacitor 85. Current flowing through resistance 88 in its collector circuit raises positive potential of the base of transistor 89 and renders this transistor conductive, causing current to flow through collector resistance 90 and emitter resistance 91. This triggers an audio oscillator including transistor 93, the emitter of which is coupled to the emitter of 89 through a capacitor 94, and energizes the speaker 24 to produce an alarm signal.

It will now be seen that the oscillator 47 drives modulator diode 44 in the antenna assembly 20 and also drives the transistor 82 which operates as a synchronous detector effecting the accumulation of a charge in capacitor 85. The charge in capacitor 85 is effected by a direct current output of the synchronous detector corresponding to that part of the amplifier signal which results from the antenna modulator. The output of the synchronous detector comprises a filter circuit which filters out noise signals and leaves only the DC output corresponding to the amplifier signal derived from antenna modulator. It is when this signal is sufficiently large that the accumulated charge in the capacitor 85 triggers the transistor 87 and the output circuit. Compensation diode 84 provides for a voltage across capacitor 85 which is just below the threshold of conduction for transistor 87. The voltage across diode 84 varies with temperature in the same manner that the threshold of conduction at the base of transistor 87 varies with temperature. The test button 33 is arranged to close a test switch 94 and connect the base of the transistor 89 to the positive terminal of the battery 17 through a resistance 95. When the button 93 is pressed to close the switch 94, the oscillator comprising the transistors 89 and 93 is triggered to produce the alarm signal and indicate that the batteries and output circuit are in operating condition.

It will be understood that any suitable squarewave oscillator may be employed as the oscillator 47. By way of example, the oscillator 47 has been shown as comprising PNP transistors 96 and 97 having their bases connected through like resistances 98 and 99 and the primary of the transformer 48 being connected between the collectors and the transistors with its central tap connected through a line 101 to a line 36. The base of each transistor is connected to the collector of the other by cross connections including capacitors 102 and 103. The secondary of the transformer 48 is floating and drives the modulator diode 44 through the connections indicated including the limiting resistance 52. Oscillator 47 is connected through a line 104 to the emitters of the transistors 96 and 97 to the positive line 35.

The details of construction of the modulator unit 20 are shown in FIGS. 4, 5 and 6; the unit comprises a metal tube 105, of which the stubs 43 and 45 are portions, and the outer conductor 38 comprising a metal tube of somewhat smaller diameter which is in open communication with the interior of the tube 105 and is soldered or otherwise bonded in conducting relationship thereto. The antenna unit is supported on the wall 15 as indicated by a sectional portion of the wall as shown and is rigidly connected to the wall in conducting relationship. This places the dipoles 22 and 23 along the focal line of the parabola of the wall 15. The center conductors 40, 42 and 46 are located centrally within the tubes 38 and 105. The opening 56 of the center conductor 40 is in register with an opening 106 in the outer wall of the tube 105 which is provided in order to reach the interior of the tube when required, for example when soldering the line 53 to the center tube section 46 at 54. The detector diode 41 is of the cartridge type and is fitted into the end of the tube portion 43 in an insulating bushing 107. The body of the cartridge is visible through slots 108 and 109 in the tube portion 43. In a similar manner the cartridge type diode 44 is mounted in the opposite end of the tube 105 in an insulating bushing 110. The body of the diode cartridge on the side of the insulating bushing remote from the tube is of conducting material and contact with the base is made through connector clips 111 and 112 for the cartridges 41 and 44, respectively. The configuration of the clip for the cartridge 41 is clearly shown in FIG. 5. The outer portion of the tube 38 up to the dipoles 22 and 23 is a shorted stub. The position of this stub with respect to the transmission line 21 comprising the tube 38 and the center tube conductor 40 may be varied according to the design of the antenna assembly, it being located at a convenient position and which may be altered in length to aid in impedance matching. The modulator stub is terminated by modulator diode 44 in the bushing 110 which by-passes the radio frequency to be received but insulates the terminal end of the diode from the transmission line. The modulation voltage which is at a frequency much lower than the radio frequency signal to be received is applied between the terminal end of the modulator diode 44 and the outer conductor 38 of the transmission line through the resistance 52 which limits the modulation current to a value which is sufficient to produce acceptable modulation.

The modulation voltage on the transmission line will be very small and equal only to the product of the modulation current and the impedance of the inner conductor 40 of the transmission line to the modulation current. This impedance is that value of impedance between the junction of the modulator stub and the transmission line to the end of the shorted stub 55. The transformer leads 51 and 53 carry the modulator current directly to the modulator stub and diode so that no modulation current flows in the transmission line or in the shorted stub 55. This isolation as stated heretofore is provided because the line 53 is insulated and passes through the shorted stub to the point 54 which is on the side of the conductor 46 remote from the conductor 42. The floating arrangement of the secondary winding 50 aids in preventing the modulation current from developing a voltage across the terminals of the transmission line. The arrangement for mounting the cartridge type microwave diodes 41 and 44 makes it possible to adopt these inexpensive detectors to a coaxial line and results in a relatively inexpensive modulated microwave antenna assembly. The tube portions 43 and 45 adjacent the diodes 41 and 44 are slotted and are to maximize the current passing through the conductor elements or pellets of the diodes. The slotting facilitates the shaping of the radio frequency field in the vicinity of the diode and thus may be employed to match the impedance of the diode assembly to that of the transmission line. The configuration of the slots and shaped portions of the tube 45 are clearly shown in FIGS. 4 and 6 where it will be noted that the portions of the tubing 45 remaining between the longitudinal slots at the sides are bowed outwardly as indicated at 114 and 115.

The outer conductor 38 is slotted at its outer end in the area of the dipoles 22 and 23 as clearly indicated in the drawings. These slots together with dipoles constitute a slotted dipole antenna.

The apparatus constructed as described above is capable of sensing the presence of continuous microwave signals far below the noise level of the detector diode and results in a system which employs modulation and synchronous type detection with a sensitivity far exceeding that of receivers employing simple modulation and video detection and which is capable of a sensitivity presently achieved only in elaborate or sophisticated continuous wave receivers. The apparatus may be incorporated in a very small portable device and may be used, for example, in checking the operation of radar transmitters or for sensing the presence of a radar beam.

While the invention has been described in connection with a specific arrangement and construction of a radio frequency wave detector, various other arrangements and modifications will occur to those skilled in the art. Therefore, it is not desired that the invention be limited to the details of construction illustrated and described and it is intended by the appended claims to cover all modifications which fall within the spirit and scope of the invention.

I claim:

1. A radio frequency signal sensing device comprising an antenna, a source of modulation signal at a predetermined frequency lower than that of the wave to be received, a detector, transmission means connecting said detector to said antenna, a modulator diode, means for connecting said diode to said transmission means, means connecting said source and said modulator diode for modulating the radio frequency energy reaching said detector, means including a shorting stub for said antenna for providing a return circuit for said detector, means for amplifying the output of said detector, and means including a synchronous detector, operating at said predetermined frequency and in synchronism with said modulator for producing a DC signal upon the reception of radio frequency energy by said antenna.

2. A radio frequency signal sensing device as set forth in claim 1 wherein said synchronous detector means includes a normally non-conducting utilization device and means dependent upon the accumulation of said DC signal produced from the modulated signal for a predetermined period for rendering said utilization device conductive.

3. A radio frequency signal sensing device as set forth in claim 2 wherein said last mentioned means includes an audio oscillator and a speaker driven thereby and operation of said oscillator is initiated upon said accumulation of said DC signal.

4. A radio frequency signal sensing device comprising an antenna, a transmission line connected to said antenna, a detector connected to said transmission line, a modulator conected to said transmission line, a source of modulation signal of predetermined frequency for said modulator, means for shorting the antenna terminals at said predetermined frequency for providing a return claim 4 wherein said modulator includes a modulator to modulate the radio frequency energy reaching said detector, means for amplifying the output of said detector, and means utilizing the amplified output of said detector to sense the reception of radio frequency energy by said antenna.

5. A radio frequency sensing device as set forth in claim 4 wherein said modulator incldues a modulator diode and said source includes a transformer having a floating secondary winding connected in series with said modulator diode.

6. A radio frequency signal sensing device as set forth in claim 4 wherein said last mentioned means includes a synchronous detector.

7. A radio frequency signal sensing device as set forth in claim 4 including means providing a separate path for the modulation current for preventing said modulator signal from flowing in said shorting means.

References Cited

UNITED STATES PATENTS

| | | | |
|---|---|---|---|
| 2,901,613 | 8/1959 | Patterson et al. | 325—340X |
| 3,094,663 | 6/1963 | Siegel | 325—364 |
| 3,258,597 | 6/1966 | Forrester | 250—199 |

ROBERT L. GRIFFIN, Primary Examiner

B. V. SAFOUREK, Assistant Examiner

U.S. Cl. X.R.

325—31, 364

UNITED STATES PATENT OFFICE
CERTIFICATE OF CORRECTION

Patent No. 3,550,008          Dated Dec. 22, 1970

Inventor(s) James A. Bright

It is certified that error appears in the above-identified patent and that said Letters Patent are hereby corrected as shown below:

Column 6, Claim 4, line 16: "conected" should be changed to read --connected--.

Column 6, Claim 4, line 20: "claim 4 wherein said modulator includes a" should be changed to --path for said detector, means for utilizing said--.

Column 6, Claim 5, line 27: "incldues" should be changed to --includes--.

Signed and sealed this 20th day of November 1973.

(SEAL)
Attest:

EDWARD M. FLETCHER, JR.          RENE D. TEGTMEYER
Attesting Officer                Acting Commissioner of Patents